United States Patent
Kuramoto et al.

(10) Patent No.: US 12,008,281 B2
(45) Date of Patent: Jun. 11, 2024

(54) JOB EXECUTION DEVICE

(71) Applicant: SEIKO EPSON CORPORATION, Tokyo (JP)

(72) Inventors: Hiroyuki Kuramoto, Shiojiri (JP); Toshifumi Sakai, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/475,832

(22) Filed: Sep. 27, 2023

(65) Prior Publication Data

US 2024/0103789 A1   Mar. 28, 2024

(30) Foreign Application Priority Data

Sep. 28, 2022   (JP) ................................. 2022-155218

(51) Int. Cl.
  G06F 3/12   (2006.01)
(52) U.S. Cl.
  CPC .......... *G06F 3/1273* (2013.01); *G06F 3/1203* (2013.01); *G06F 3/1257* (2013.01); *G06F 3/1258* (2013.01); *G06F 3/1262* (2013.01)
(58) Field of Classification Search
  CPC .... G06F 3/1273; G06F 3/1203; G06F 3/1257; G06F 3/1258; G06F 3/1262
  See application file for complete search history.

(56) References Cited

U.S. PATENT DOCUMENTS

| | | | | |
|---|---|---|---|---|
| 2020/0249891 | A1* | 8/2020 | Kawakami | G06F 3/1273 |
| 2021/0185185 | A1* | 6/2021 | Takeo | H04N 1/00037 |
| 2022/0070318 | A1* | 3/2022 | Ogino | H04N 1/0097 |
| 2022/0094799 | A1* | 3/2022 | Chiba | H04N 1/00503 |
| 2022/0417372 | A1* | 12/2022 | Yoshida | H04N 1/00413 |
| 2023/0262174 | A1* | 8/2023 | Maruyama | H04N 1/00411 |
| | | | | 358/1.13 |
| 2024/0007571 | A1* | 1/2024 | Kado | H04N 1/00413 |

FOREIGN PATENT DOCUMENTS

JP    2021100795 A    7/2021

* cited by examiner

*Primary Examiner* — Iriana Cruz
(74) *Attorney, Agent, or Firm* — CHIP LAW GROUP

(57) ABSTRACT

A job execution device includes a display unit, a storage unit that stores a first history group that is a history of a job group executed based on a setting received on a first home screen, and a second history group that is a history of a job group executed based on a setting received on a second home screen different from the first home screen, and a controller that display a display screen including the first home screen and the second home screen on the display unit, wherein the first home screen includes a first object group that receives an instruction to re-execute a first job that was executed, the first job being included in the first history group, and a second object group that receives an instruction to re-execute a second job that was executed, the second job being included in the second history group.

7 Claims, 7 Drawing Sheets

JOB EXECUTION DEVICE

The present application is based on, and claims priority from JP Application Serial Number 2022-155218, filed Sep. 28, 2022, the disclosure of which is hereby incorporated by reference herein in its entirety.

BACKGROUND

1. Technical Field

The present disclosure relates to a job execution device.

2. Related Art

In the related art, there has been known a device that displays a plurality of operation screens. For example, JP-A-2021-100795 discloses an image forming apparatus that displays a first home screen and a second home screen different from the first home screen. On the first home screen, the static mode home screen basically provides all users with the same screen, and allows each user to customize the order of buttons. On the second home screen, the contents and the order of buttons presented to the user are changed according to the state of the image processing device 1.

A job execution device that can switch between and display a plurality of operation screens has room for improvement from the standpoint of improving user convenience.

SUMMARY

According to an aspect of the present disclosure, a job execution device includes a display unit, a storage unit that stores a first history group that is a history of a job group executed based on a setting received on a first screen, and a second history group that is a history of a job group executed based on a setting received on a second screen different from the first screen, and a controller that display a display screen including the first screen and the second screen on the display unit, wherein the first screen includes a first object that receives an instruction to re-execute a first job that was executed, the first job being included in the first history group, and a second object that receives an instruction to re-execute a second job that was executed, the second job being included in the second history group.

DESCRIPTION OF EMBODIMENTS

1. Configuration of Multifunction Machine

Figure 1:
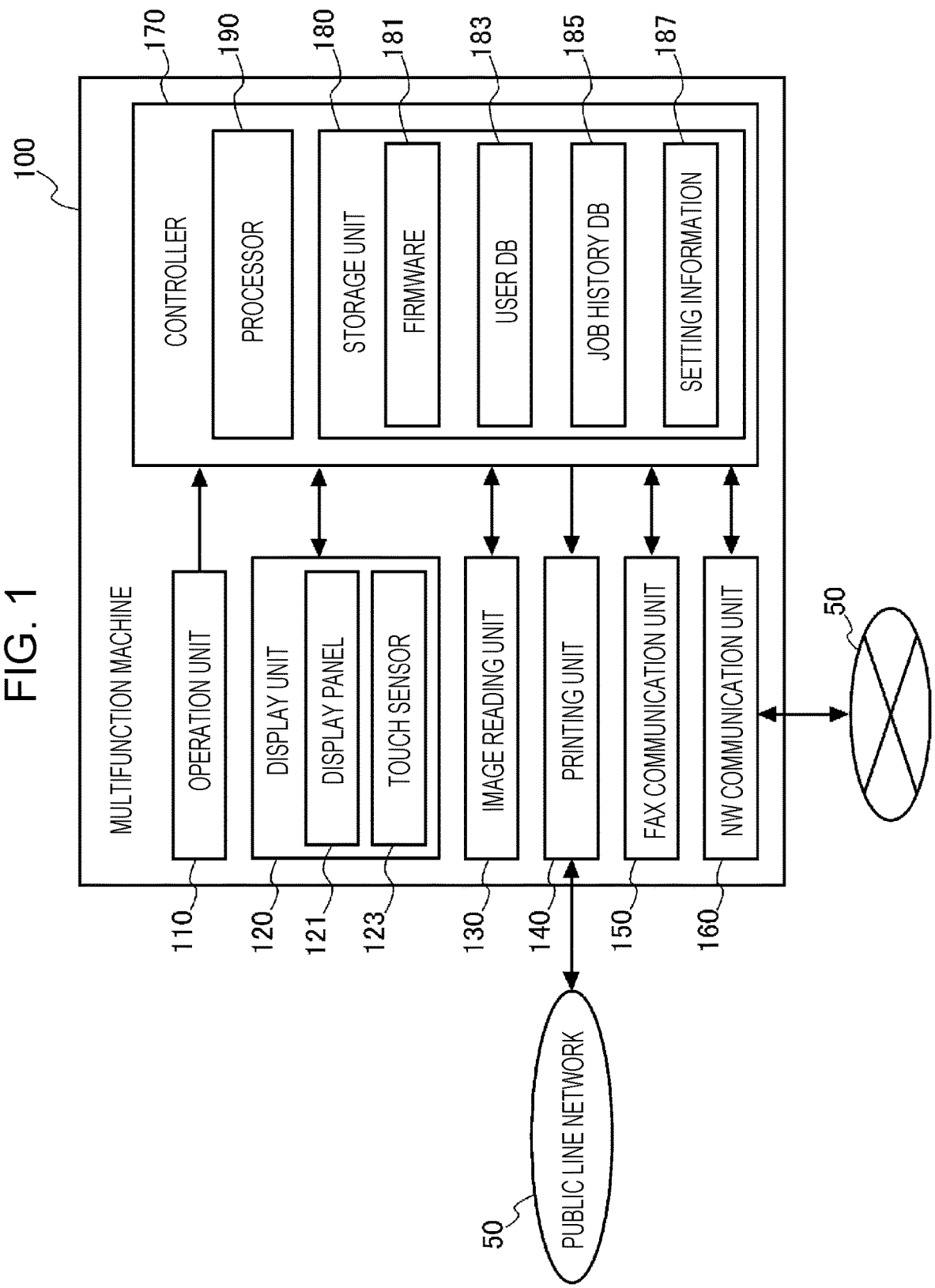
FIG. 1 is a block diagram showing the configuration of a multifunction machine.

FIG. 1 is a block diagram showing the configuration of a multifunction machine 100 that is an example of a job execution device. The multifunction machine 100 includes an operation unit 110, a display unit 120, an image reading unit 130, a printing unit 140, a facsimile communication unit 150, a network communication unit 160, and a controller 170. Hereinafter, the facsimile communication unit 150 will be referred to as a FAX communication unit 150, and the network communication unit 160 will be referred to as an NW communication unit 160.

The operation unit 110 includes physical keys such as a numeric key, an enter key, and a start key. Illustration of physical keys is omitted. The operation unit 110 outputs an operation signal corresponding to the physical key operated by the user to the controller 170.

The display unit 120 includes a display panel 121 such as a liquid crystal display or organic electro luminescence (EL), and a touch sensor 123. The touch sensor 123 detects a user's touch operation. The touch operation is an operation performed by the user by touching the display panel 121 with a finger or an indicator of the user. The touch sensor 123 detects a touch operation to output coordinate information indicating the position of the detected touch operation to the controller 170. The coordinate information is information indicating coordinates in a coordinate system preset in the display panel 121.

The image reading unit 130 includes a light source, an image sensor, an actuator, a drive circuit that drives the actuator, a sensor, and the like. Illustrations of the light source, the image sensor, the actuator, the drive circuit that drives the actuator, and the sensor are omitted. The image reading unit 130 reads an image of a document placed on a document platen and converts the read image of the document into image data. The image reading unit 130 outputs the converted image data to the controller 170.

The printing unit 140 includes an ink cartridge that stores ink, and a head that ejects the ink supplied from the ink cartridge onto a sheet. Illustrations of the ink cartridge and the head are omitted. The printing unit 140 prints an image on a sheet by an ink jet method under the control of the controller 170. The printing unit 140 is not limited to a configuration that performs printing by the ink jet method, but may be configured to perform printing by an electrophotographic method.

The FAX communication unit 150 is a communication interface including a facsimile communication module that performs FAX communication through a public line network 30, and transmits and receives image data to and from another facsimile device or the like through the public line network 30.

The NW communication unit 160 includes, for example, a network adapter such as a network interface card (NIC). The NW communication unit 160 performs data communication with an information processing device connected to a network 50 and receives print data. Illustration of the information processing device is omitted. The information processing device is a device such as a personal computer, a tablet terminal, or a smartphone used by a user.

The controller 170 is a computer device that includes a storage unit 180 and a processor 190.

The storage unit 180 includes a random access memory (RAM) and a read only memory (ROM). The RAM is used as a calculation region for the processor 190. The ROM stores firmware 181, a user database 183, a job history database 185, and setting information 187. Hereinafter, the database is abbreviated as DB. The firmware 181 is a control program executed by the processor 190.

The user DB 183 is a database that registers identification information about registered users, and one record of the user DB 183 includes a user ID and a password. The user ID and the password are information registered by a user.

The job history DB 185 stores history information about a job executed by the multifunction machine 100. The job history DB 185 stores a first history group that is a history of a job that has been executed based on a setting received on a first home screen 200, which will be described later. The job history DB 185 also stores a second history group that is a history of a job that has been executed based on a setting received on a second home screen 300, which will be described later. Here, the job means a process executed using functions installed in the multifunction machine 100. The jobs executed by the multifunction machine 100 include printing, copying, scanning and facsimile, scanning and saving, and the like.

One record of the job history DB 185 includes, for example, a user ID, date and time information indicating the date and time when the job was executed, a job setting indicating a setting of the job, print data, and identification information. When the job refers to printing, the job setting includes a double-sided or single-sided setting, a color or black-and-white setting, information about a size of paper on which an image is printed, and the like. The print data is data that is actually printed on a sheet. The print data corresponds to processing data. The identification information is information identifying whether the job belongs to the first history group or the second history group. Also, one record of the job history DB 185 may include a print data acquisition method. The print data acquisition method includes, for example, reading from a USB memory and receiving from an information processing device.

The setting information 187 is information indicating various settings of the multifunction machine 100. For example, the setting information 187 includes a setting for a job history display 245 displayed on a timeline 240 of the first home screen 200, which will be described later. This setting is information that sets whether only the job history display 245 showing the history of jobs executed based on the setting received on the first home screen 200 is displayed, or whether the job history executed based on the setting received on both the first home screen 200 and the second home screen 300 is displayed. This setting is referred to as a history display setting. Further, the setting information 187 includes a setting as to whether the first home screen 200 is to be displayed or the second home screen 300 is to be displayed on the display panel 121 immediately after the power of the multifunction machine 100 is turned on or after the multifunction machine 100 returns from the sleep state to the normal state. The setting included in the setting information 187 is referred to as a screen display setting.

The processor 190 includes a central processing unit (CPU) and a micro processor unit (MPU). The processor 190 may be composed of a single processor or may be composed of a plurality of processors. The processor 190 may be composed of part or all of the storage unit 180 or a system on a chip (SoC) integrated with another circuit. Also, the processor 190 may be configured by a combination of a CPU that executes programs and a digital signal processor (DSP) that executes a predetermined arithmetic process.

When the controller 170 detects the occurrence of a return event in the sleep state, the controller 170 returns the multifunction machine 100 from the sleep state to the normal state, and displays the first home screen 200 or the second home screen 300 on the display panel 121 according to the screen display setting. The return event detected by the controller 170 includes, for example, receiving an operation or a touch operation of the operation unit 110, receiving facsimile data by the FAX communication unit 150, and receiving print data by the NW communication unit 160.

The sleep state includes a power state in which, for example, the power consumption of the multifunction machine 100 is reduced by limiting power supply to the display panel 121, the image reading unit 130, the printing unit 140, and the like. Even in the sleep state, power supply to the operation unit 110, the FAX communication unit 150, and the NW communication unit 160 is not limited, or is limited within the operable range. The normal state includes a power state in which restriction of the power supply to the display panel 121, the image reading unit 130, the printing unit 140, and the like is released, the power supply to these functional units is resumed, and a job can be executed when a request for processing the job is received.

Figure 2:
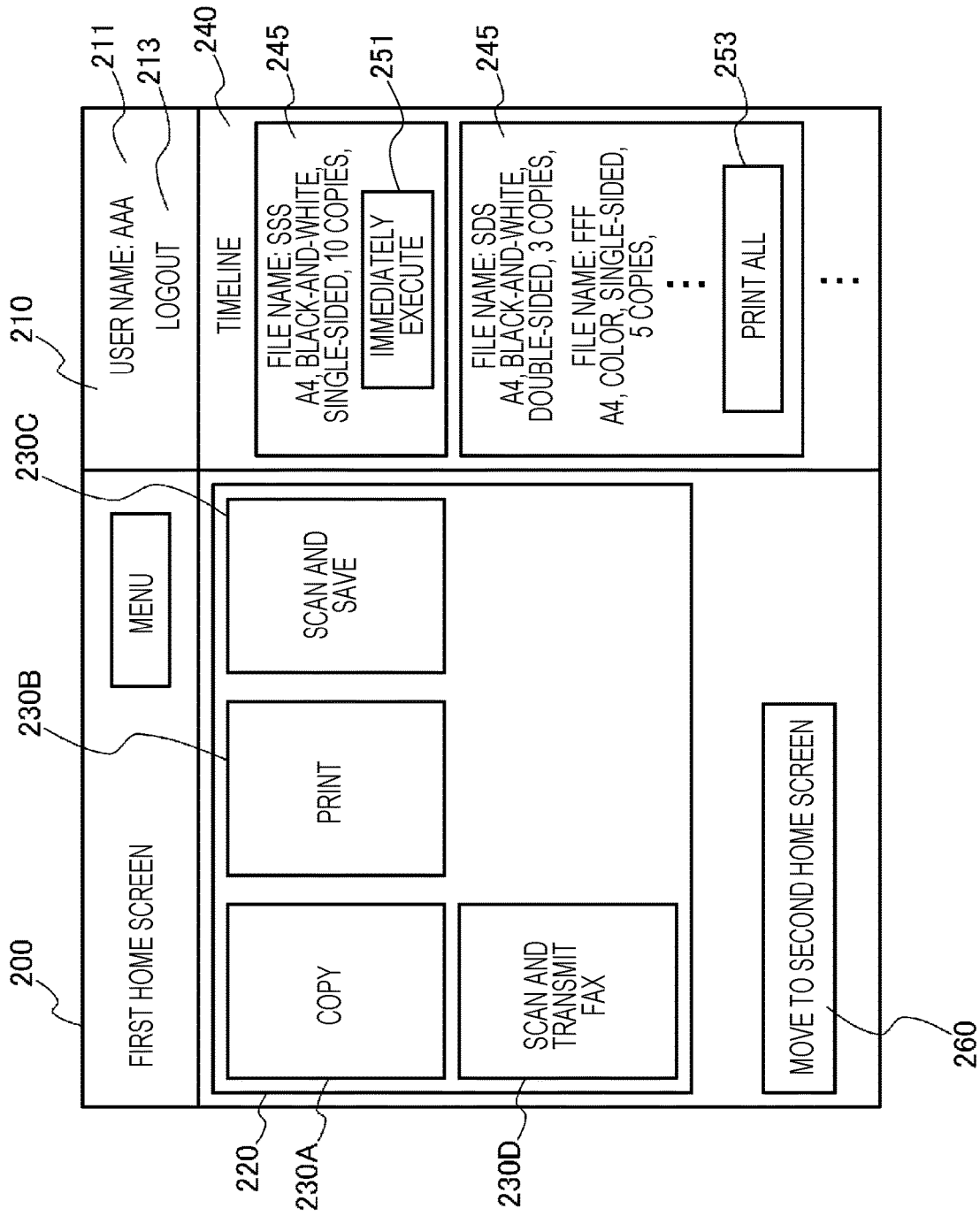
FIG. 2 is a diagram showing a first home screen.

FIG. 2 is a diagram showing the first home screen 200. The first home screen 200 corresponds to a first screen. The first home screen 200 is a screen for selecting a job to be executed by the multifunction machine 100, and includes a first user display region 210, a first function selection region 220, the timeline 240, and a screen switching button 260.

The first user display region 210 includes a user name 211 and a logout button 213. The user name 211 is the user name of the logged-in user. The logout button 213 is a button for instructing logout and ending the use of the multifunction machine 100.

The first function selection region 220 includes a plurality of function selection buttons 230. The function selection button 230 is a button for selecting a function to be executed by the multifunction machine 100. FIG. 2 shows an example in which four function selection buttons 230 of function selection buttons 230A to 230D are displayed, but the number of function selection buttons 230 displayed in first function selection region 220 is any number. In the example shown in FIG. 2, the function selection button 230A is set as a button for selecting the copy function, and the function selection button 230B is set as a button for selecting the print function. The function selection button 230C is set as a button for selecting the function of scanning and saving, and the function selection button 230D is set as a button for selecting the function of scanning and FAX transmission.

The timeline 240 can display a history of the job instructed by the logged-in user using the first home screen 200 and a history of the job instructed by the logged-in user using the second home screen 300, which will be described later. On the timeline 240, among the job instructed using the first home screen 200 and the job instructed using the second home screen 300, the job history display 245 is displayed for each of the predetermined number of jobs in chronological order from a job when the date and time when the job was processed is the most recent. When the job history display 245 displays the executed jobs included in the first history group, the corresponding executed job of the first history group is re-executed by selecting the job history display 245 by a touch operation. When the job history display 245 displays the executed jobs included in the second history group, the corresponding executed job of the second history group is re-executed by selecting the job history display 245 by a touch operation.

When the job history display 245 represents the history of jobs executed based on the setting received on the first home screen 200, the job history display 245 corresponds to a first object. A plurality of job history displays 245 corresponding to the first objects correspond to a first object group. Further, when the job history display 245 represents the history of jobs executed based on the setting received on the second home screen 300, the job history display 245 corresponds to a second object. A plurality of job history displays 245 corresponding to the second objects correspond to a second object group.

The job history display 245 displays a job setting. For example, when the job history display 245 represents a printing history, a file name, the number of copies, a color or black-and-white setting, a single-sided or double-sided setting, a paper size, and the like are displayed as the job setting. When the job history display 245 represents a scanning history, information indicating whether the scanning is color scanning or monochrome scanning, information indicating the size of the read image data, and the like are displayed as the job setting. Further, when the job history display 245 represents a history of FAX transmission of scanned image data, a FAX number indicating a FAX transmission destination is displayed as the job setting. Also, when the job history display 245 represents a history of saving scanned image data in a folder, information indicating the folder in which the image data is saved is displayed as the job setting.

Further, when the history display setting included in the setting information 187 is a setting to display only the job history of the first home screen 200, the timeline 240 displays the job history display 245 of a job processed according to the setting received on the first home screen 200. Further, when the history display setting included in the setting information 187 is a setting to display only the job history of the first home screen 200, only the history of the job executed based on the setting received on the first home screen 200 may be stored in the job history DB 185. In other words, the job history DB 185 does not store the history of the job executed based on the setting received on second home screen 300.

Also, the job history display 245 displayed on the timeline 240 includes the job history display 245 in which an immediate execution button 251 and a print all button 253 are displayed. The immediate execution button 251 corresponds to a second operator, and the print all button 253 corresponds to a fourth operator. When an immediate execution button 340 is pressed on the second home screen 300 (to be described later), the immediate execution button 251 is displayed in the job history display 245 that displays the history information about the job immediately executed by the multifunction machine 100. When a selection button 330D is pressed on the second home screen 300, the print all button 253 is displayed in the job history display 245 that displays the history information about a plurality of jobs batch-executed by the multifunction machine 100.

When the immediate execution button 251 is pressed, the controller 170 immediately executes the job displayed, as a history, by the job history display 245 displaying the immediate execution button 251. The controller 170 acquires, from the storage unit 180, the print data of the job displayed, as a history, by job history display 245, outputs the acquired print data to the printing unit 140, and causes the printing unit 140 to perform printing.

Further, when a region, other than the immediate execution button 251, in the job history display 245 is pressed, the controller 170 displays, on the display panel 121, a setting screen for receiving a setting of a job displayed, as a history, by the job history display 245. The setting screen displays a plurality of setting items such as color or black-and-white, single-sided printing or double-sided printing. Upon receiving the setting of the plurality of setting items, the controller 170 executes the job according to the setting of the plurality of setting items.

When the print all button 253 is pressed, the controller 170 batch-prints a plurality of jobs displayed, as a history, by the job history display 245 displaying the print all button 253. At this time, when a plurality of pieces of print data corresponding to a plurality of jobs is not stored in the storage unit 180, the controller 170 displays, on the display panel 121, a guide indicating that the print data is not stored. In addition, the controller 170 may display, on the display panel 121, the display that guides a method of reacquiring print data, such as "couple a USB memory that stores print data to the USB port of the multifunction machine 100" or "resend the print data from the information processing device". The display panel 121 corresponds to a notification unit. Further, the operation of displaying, on the display panel 121, a guide indicating that the print data is not saved corresponds to a notification operation.

Figure 3:
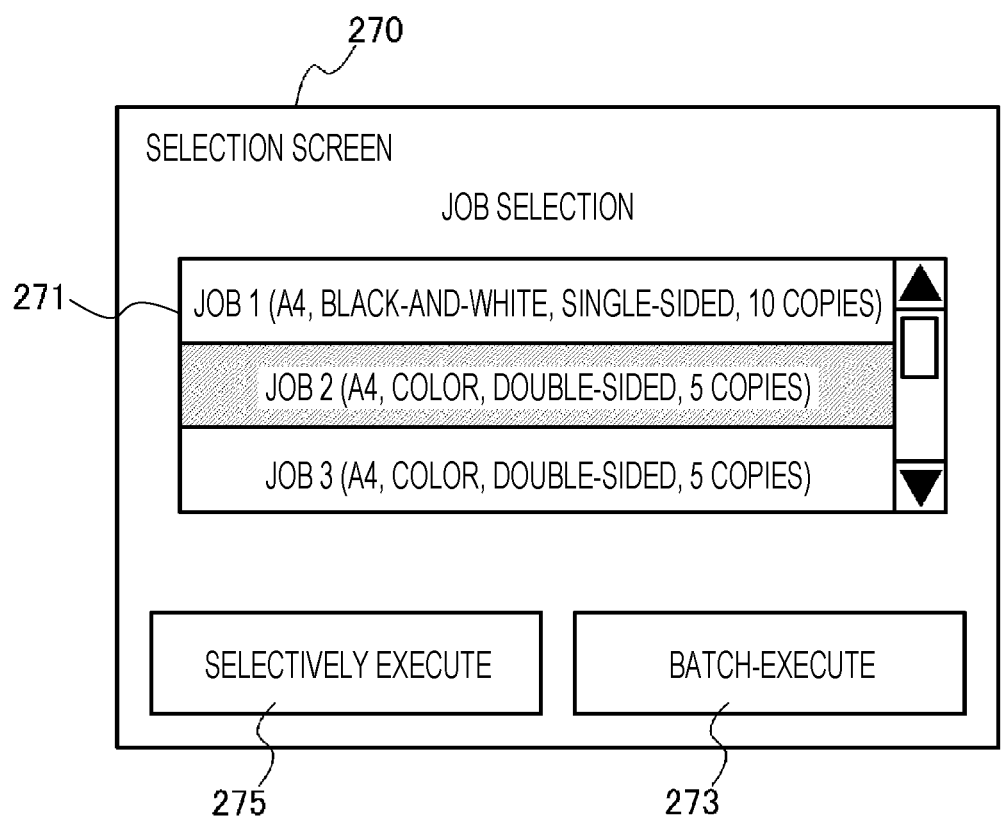
FIG. 3 is a diagram showing a selection screen.

FIG. 3 is a diagram showing a selection screen 270. Further, the controller 170 may display the selection screen 270 shown in FIG. 3 when a region, other than the print all button 253, in the job history display 245 is pressed. The selection screen 270 displays a job display field 271, a batch execution button 273, and a selection execution button 275. The job display field 271 displays all the jobs that have been printed in batch and the job setting of each job. The batch execution button 273 is a button for instructing batch execution of all jobs displayed in the job display field 271. The selection execution button 275 is a button for instructing execution of a job selected from among the jobs displayed in the job display field 271.

The user presses the batch execution button 273 when batch-executing all jobs. Also, the user selects a job to be re-executed from among the jobs displayed in the job display field 271 by a touch operation or a mouse operation, and presses the selection execution button 275. As a result, the controller 170 re-executes only the selected job.

The screen switching button 260 is a button for instructing switching from the first home screen 200 to the second home screen 300. When the screen switching button 260 is pressed, the controller 170 switches the screen displayed on display panel 121 from the first home screen 200 to the second home screen 300.

Figure 4:
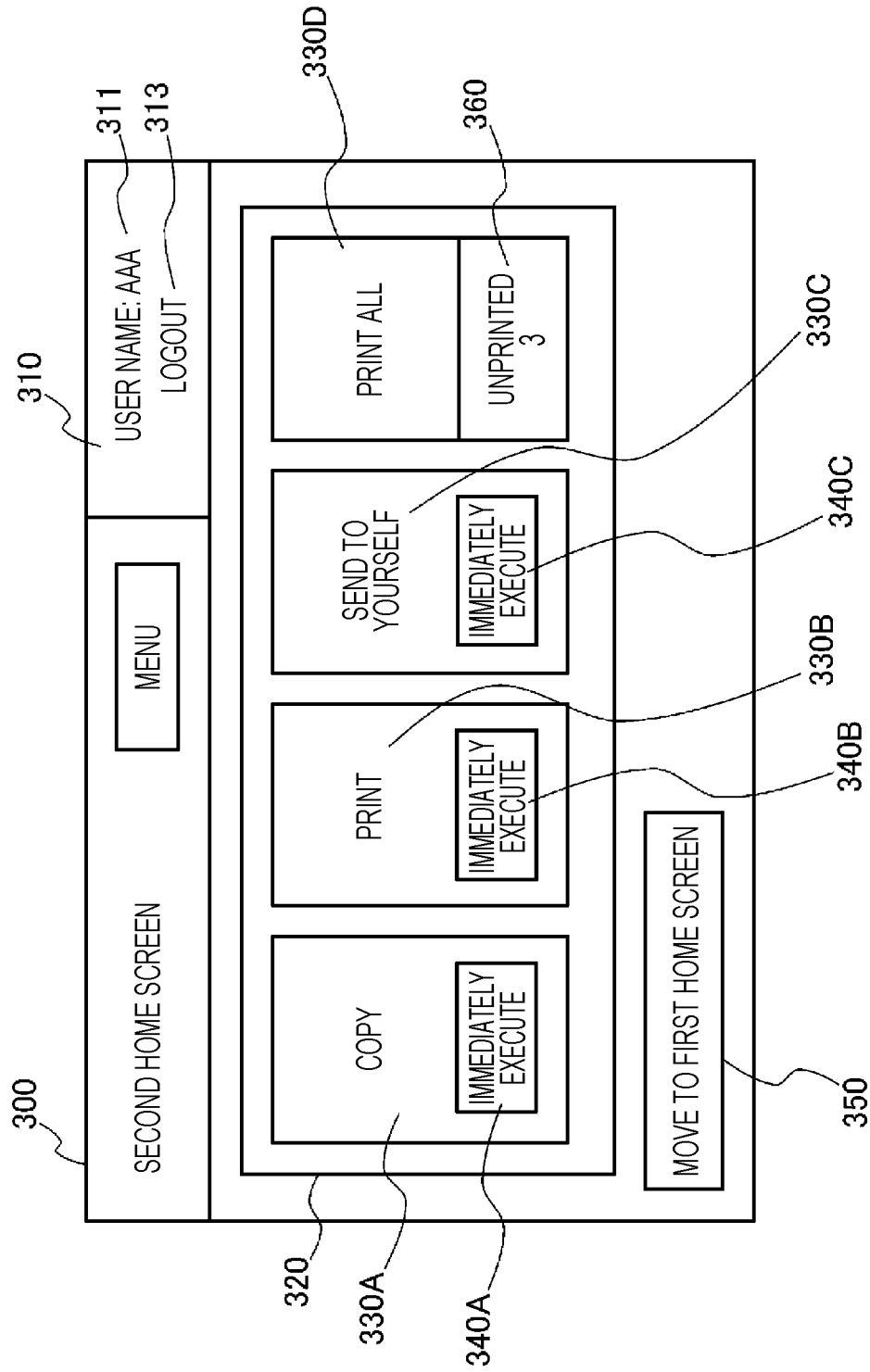
FIG. 4 is a diagram showing a second home screen.

FIG. 4 is a diagram showing the second home screen 300. The second home screen 300 corresponds to a second screen. The second home screen 300 is a screen for selecting a job to be executed by the multifunction machine 100, and includes a second user display region 310, a second function selection region 320, and a screen switching button 350.

The second user display region 310 displays a user name 311 and a logout button 313 as in the first user display region 210.

The second function selection region 320 displays selection buttons 330 for selecting functions of the multifunction machine 100 that can be used by the user. FIG. 3 shows an example in which four selection buttons 330A, 330B, 330C, and 330D are displayed as the selection buttons 330, but the number of selection buttons 330 is not limited to four. The selection buttons 330A, 330B, 330C, and 330D are buttons for selecting functions of the multifunction machine 100, such as copying, printing, scanning and saving, and printing all. The selection buttons 330 displayed in the second function selection region 320 are buttons associated with functions frequently used by the logged-in user. Also, the selection button 330 displayed in the second function selection region 320 may be a button associated with the function selected by the user.

Immediate execution buttons 340A, 340B and 340C are displayed in the selection buttons 330A, 330B and 330C, respectively. Hereinafter, the immediate execution buttons 340A, 340B, and 340C will be collectively referred to as the immediate execution button 340. The immediate execution button 340 corresponds to a first operator. The immediate execution button 340 is a button for instructing immediate execution of the job. When the immediate execution button 340 is pressed, the controller 170 immediately executes the function associated with the selection button 330. Further, when a region, other than the immediate execution button 340, of the selection button 330 is pressed, the controller 170 displays the setting screen of the function associated with the selection button 330, receives the setting of the setting screen, and executes the function associated with the selection button 330 according to the received setting of the setting screen. When the immediate execution button 340 is pressed, the controller 170 may execute the function according to the setting when the corresponding function was selected last time, or may execute the function according to the default setting.

Also, the selection button 330D is set as a button for selecting the function of printing all. The selection button 330D corresponds to a third operator. "Printing all" is a function that causes the multifunction machine 100 to batch-print all the print data received from the information processing device used by the logged-in user. In a case where the information processing device used by the user is away from the multifunction machine 100, there is a possibility that the printed paper may be seen by a third party when the multifunction machine 100 immediately prints the print data received from the information processing device. Therefore, when receiving print data from the information processing device, the multifunction machine 100 temporarily stores the received print data in the storage unit 180. Then, when the user stands in front of the multifunction machine 100, operates the operation unit 110 to log in to the multifunction machine 100, and presses the selection button 330D, the controller 170 reads the received print data from the storage unit 180 and causes the printing unit 140 to start printing. The selection button 330D set to "printing all" is provided a display field 360 for displaying the number of pieces of unprinted print data.

The screen switching button 350 is a button for instructing switching from the second home screen 300 to the first home screen 200. When the screen switching button 350 is pressed, the controller 170 switches the screen displayed on display panel 121 from the second home screen 300 to the first home screen 200.

2. Multifunction Machine Operation

Figure 5:
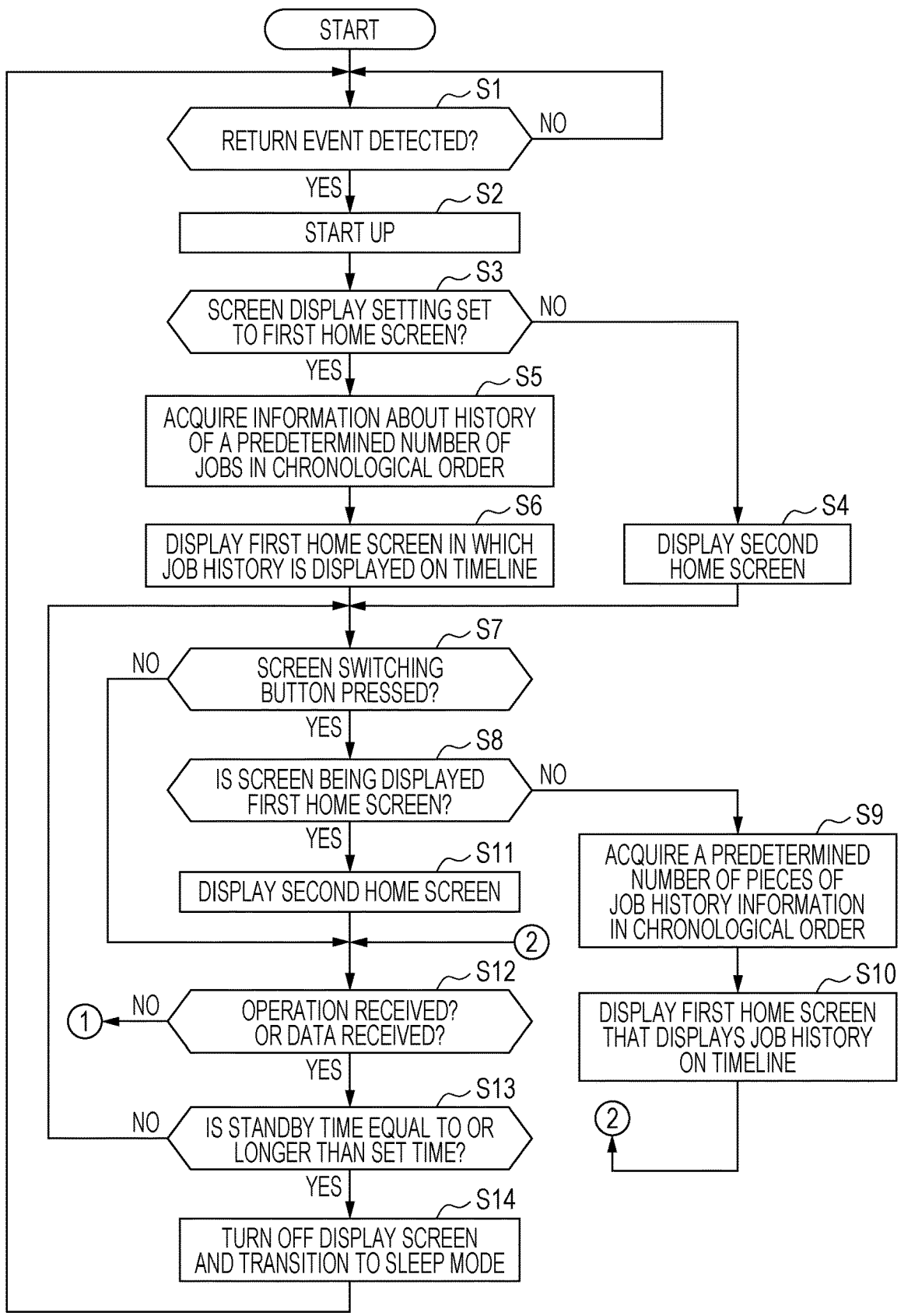
FIG. 5 is a flow chart showing the operation of the multifunction machine.
Figure 6:
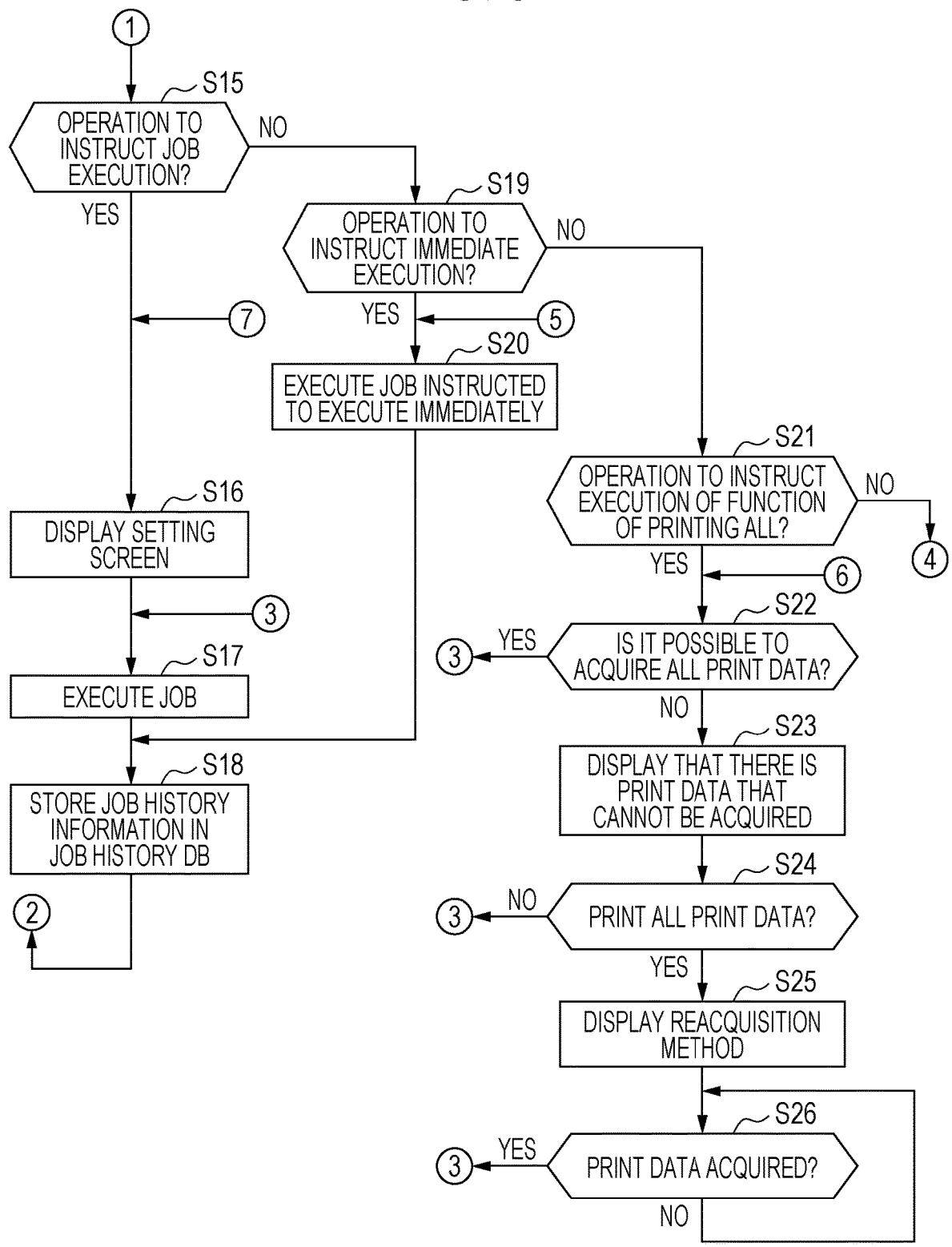
FIG. 6 is a flowchart showing the continuation of the operation of the multifunction machine.

FIGS. 5 and 6 are flowcharts showing the operation of the controller 170. Specifically, FIG. 5 is a flowchart showing the operation of switching the display screen displayed on the display panel 121 between the first home screen 200 and the second home screen 300. Note that this flowchart shows a case where the process is started from a sleep state in which the display on the display panel 121 is turned off.

First, the controller 170 determines whether an event of returning from the sleep state to the normal state has been detected (step S1). When the return event is not detected (step S1/NO), the controller 170 waits until the return event is detected.

When the return event is detected (step S1/YES), the controller 170 returns from the sleep state to the normal state and starts up (step S2), and refers to the screen display setting of the setting information 187 to determine whether the display setting of the home screen is the first home screen 200 (step S3). When the screen display setting is not the first home screen 200 (step S3/NO), the controller 170 displays the second home screen 300 on the display panel 121 (step S4).

When the display setting of the home screen is the first home screen 200 (step S3/YES), the controller 170 acquires, from the job history DB 185, information about the history of a predetermined number of jobs in chronological order from a job when the date and time when the job was processed is the most recent (step S5). Then, the controller 170 displays, on the display panel 121, the first home screen 200 in which the acquired information about the history of a predetermined number of jobs is displayed on the timeline 240 in chronological order as the job history display 245 (step S6). The job history display 245 displayed on the timeline 240 includes the job history display 245 displaying the executed jobs included in the first history group as a history, and the job history display 245 displaying the executed jobs included in the second history group as a history.

When the first home screen 200 or the second home screen 300 is displayed on the display panel 121, the controller 170 determines whether the screen switching button 260 or 350 has been pressed (step S7). When the screen switching button 260 or 350 is not pressed (step S7/NO), the controller 170 advances the process to the determination in step S12.

Further, when the screen switching button 260 or 350 is pressed (step S7/YES), the controller 170 determines whether the screen being displayed on the display panel 121 is the first home screen 200 (step S8). When the screen being displayed on the display panel 121 is not the first home screen 200 but the second home screen 300 (step S8/NO), the controller 170 acquires information about the history of a predetermined number of jobs in chronological order from a job when the date and time when the job was processed is the most recent (step S9). Then, the controller 170 displays, on the display panel 121, the first home screen 200 in which the acquired information about the history of a predetermined number of jobs is displayed on the timeline 240 as the job history display 245 (step S10). The job history display 245 displayed on the timeline 240 includes the job history display 245 displaying the executed jobs included in the first history group as a history, and the job history display 245 displaying the executed jobs included in the second history group as a history. After displaying the first home screen 200 on the display panel 121, the controller 170 advances the process to the determination in step S12.

Further, when the screen being displayed on the display panel 121 is the first home screen 200 (step S8/YES), the controller 170 displays the second home screen 300 on the display panel 121 (step S11). After that, the controller 170 determines whether data has been received by the operation or the touch operation of the operation unit 110, the FAX communication unit 150, or the NW communication unit 160 (step S12). When the data is received by the operation or the touch operation of the operation unit 110, the FAX communication unit 150, or the NW communication unit 160 (step S12/YES, the controller 170 advances the process to the flowchart shown in FIG. 6.

In addition, when the data is not received by the operation or the touch operation of the operation unit 110, the FAX communication unit 150, or the NW communication unit 160 (step S12/NO), the controller 170 determines whether the standby time after starting the standby is equal to or longer than the set time (step S13). When the standby time after starting the standby is not equal to or longer than the set time (step S13/NO), the controller 170 returns the process to the determination of step S7. In addition, when the standby time after starting the standby is equal to or longer than the set time (step S13/YES), the controller 170 turns off the display of the display screen and transitions from the normal state to the sleep state (step S14).

Next, the operation when the operation unit 110 receives an operation or when the FAX communication unit 150 or the NW communication unit 160 receives data will be described with reference to the flowchart shown in FIG. 6. When the operation unit 110 receives the operation (step S12/YES), the controller 170 determines whether the received operation is an operation to instruct execution of a job (step S15). When the received operation is an operation to instruct execution of a job (step S15/YES), the controller 170 displays a setting screen for receiving a setting for the job instructed to be executed (step S16). Then, upon receiving the setting on the setting screen, the controller 170 executes the job according to the received setting on the setting screen (step S17). After that, the controller 170 stores the job history display 245 that is the information about the executed job in the job history DB 185 (step S18), and returns the process to the determination of step S12 shown in FIG. 5.

Further, when the received operation is not an operation to instruct execution of a job (step S15/NO), the controller 170 determines whether the operation is an operation to instruct immediate execution of a job (step S19). When the received operation is an operation of the immediate execution button 340 displayed on the second home screen 300, the controller 170 determines that the received operation is an operation to instruct immediate execution of a job. When the operation is an operation to instruct immediate execution of a job (step S19/YES), the controller 170 executes the job instructed to be executed immediately (step S20). After that, the controller 170 stores the job history display 245 that is the information about the executed job in the job history DB 185 (step S18), and returns the process to the determination of step S12 shown in FIG. 5.

Further, when the received operation is not an operation instructing immediate execution of a job (step S19/NO), the controller 170 determines whether the operation is an operation to instruct executing the function of printing all (step S21). When the received operation is an operation to instruct executing the function of printing all (step S21/YES), the controller 170 determines whether print data of all jobs to be all printed can be acquired from the storage unit 180 (step S22). The controller 170 determines whether print data for all jobs to be all printed is stored in the storage unit 180 and the print data can be acquired from the storage unit 180.

When it is determined that the print data of all jobs to be all printed can be acquired (step S22/YES), the controller 170 executes all the jobs to be all printed (step S17). After that, the controller 170 stores the job history display 245 that is the information about the executed job in the job history DB 185 (step S18), and returns the process to the determination of step S12 shown in FIG. 5.

When it is determined that the print data of all the jobs to be all printed cannot be acquired (step S22/NO), the controller 170 displays on the display panel 121 that there is print data that cannot be acquired (step S23). Further, the controller 170 displays, on the display panel 121, a guide inquiring about whether to print only jobs whose print data can be acquired.

Upon receiving an operation to print only jobs whose print data can be acquired (step S24/NO), the controller 170 executes the jobs by printing print data that can be acquired (step S17). After that, the controller 170 stores the job history display 245 that is the information about the executed job in the job history DB 185 (step S18), and returns the process to the determination of step S12 shown in FIG. 5.

Further, upon receiving an operation to print all the print data (step S24/YES), the controller 170 displays, on the display panel 121, a method of reacquiring the print data that cannot be acquired from the storage unit 180 (step S25). The controller 170 displays, on the display panel 121, for example, a guide to couple a USB memory storing print data to the USB port of the multifunction machine 100. In addition, the controller 170 displays, on the display panel 121, a guide to instruct the information processing device coupled to the multifunction machine 100 to resend the print data. Then, the controller 170 determines whether all print data to be all printed has been acquired (step S26).

When all the print data has not been acquired (step S26/NO), the controller 170 waits until all the print data is acquired. Further, when all the print data are acquired (step S26/YES), the controller 170 executes a job that prints all the print data (step S17). After that, the controller 170 stores the job history display 245 that is the information about the executed job in the job history DB 185 (step S18), and returns the process to the determination of step S12 shown in FIG. 5.

Figure 7:
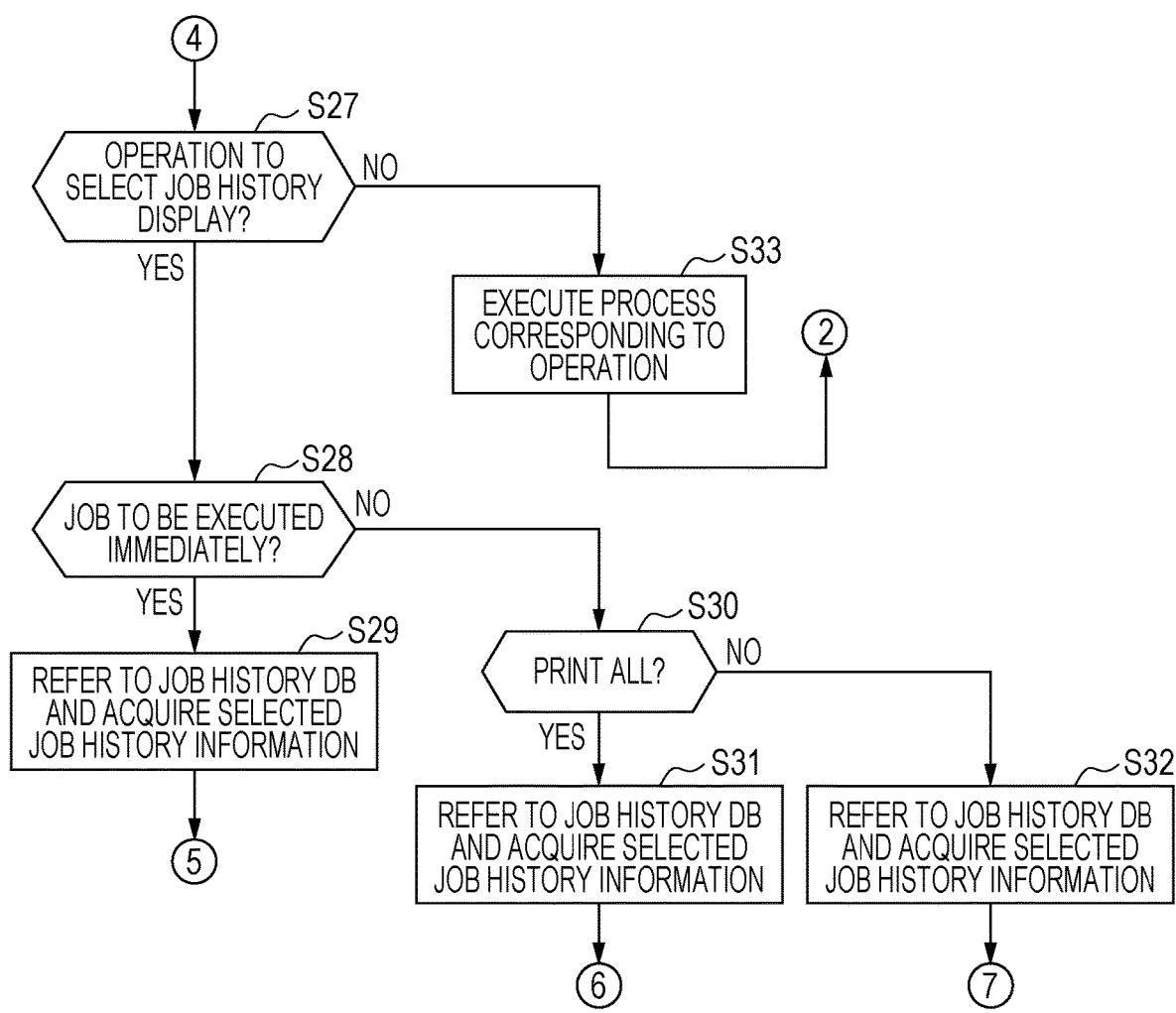
FIG. 7 is a flow chart showing the continuation of the operation of the multifunction machine.

Next, the operation when the determination in step S21 is negative will be described with reference to the flow chart of FIG. 7. In step S21, when the received operation is not an operation to instruct executing the function of printing all (step S21/NO), the controller 170 determines whether the operation is an operation to select the job history display 245 displayed on the first home screen 200 (step S27).

When it is determined that the operation is an operation to select the job history display 245 (step S27/YES), the controller 170 determines whether the immediate execution button 251 of the job history display 245 has been pressed (step S28). When it is determined that the immediate execution button 251 has been pressed (step S28/YES), the controller 170 acquires job history information corresponding to the selected job history display 245 by referring to the job history DB 185 (step S29), and immediately executes a job based on the acquired job history information (step S20). After that, the controller 170 stores the job history information in the job history DB 185 (step S18), and returns the process to the determination of step S12 shown in FIG. 5.

When it is determined that the immediate execution button 251 has not been pressed (step S28/NO), the controller 170 determines whether the print all button 253 has been pressed (step S30). When it is determined that the print all button 253 has been pressed (step S30/YES), the controller 170 acquires job history information corresponding to the selected job history display 245 by referring to the job history DB 185 (step S31), and advances the process to the determination in step S22. Since the processing after step S22 has already been explained, description will be omitted.

When it is determined that the print all button 253 has not been pressed (step S30/NO), the controller 170 acquires job history information corresponding to the selected job history display 245 by referring to the job history DB 185 (step S32), and advances the process to step S16. Since the processing after step S16 has already been explained, it will be omitted.

When it is determined that the operation is not an operation to select the job history display 245 (step S27/NO), the controller 170 executes a process corresponding to the received operation (step S33), and returns the process to the determination of step S12 shown in FIG. 5. Here, as a process corresponding to the received operation, for example, the controller 170 executes a process of printing print data received by the FAX communication unit 150 or the NW communication unit 160.

3. Summary of Present Disclosure

A summary of the present disclosure is appended below.

Appendix 1

A job execution device including a display unit, a storage unit that stores a first history group that is a history of a job group executed based on a setting received on a first screen, and a second history group that is a history of a job group executed based on a setting received on a second screen different from the first screen, and a controller that display a display screen including the first screen and the second screen on the display unit, wherein the first screen includes a first object that receives an instruction to re-execute a first job that was executed, the first job being included in the first history group, and a second object that receives an instruction to re-execute a second job that was executed, the second job being included in the second history group.

According to this configuration, the first object group and the second object group are displayed on the first screen. Therefore, it is possible to instruct re-execution of the job executed based on the setting received on the first screen and the job executed based on the setting received on the second screen from the first screen, and the user's convenience can be improved.

Appendix 2

The job execution device according to Appendix 1, wherein the controller displays the first object and the second object on the first screen in chronological order.

According to this configuration, the first object group and the second object group are displayed in chronological order on the first screen. Therefore, when instructing re-execution of the job from the first screen, it is easier to find the object, and the user's convenience can be improved.

Appendix 3

The job execution device according to Appendix 1, wherein the second screen includes a first operator that receives an instruction to immediately execute a job, and wherein the second object receives an operation of the first operator and receives an instruction to immediately re-execute a job immediately executed by the job execution device.

According to this configuration, the second object group includes a second object that receives an instruction to immediately re-execute the job. Therefore, it is possible to immediately instruct re-execution of the job from the first screen, and the user's convenience can be improved.

Appendix 4

The job execution device according to Appendix 3, wherein the second object includes a second operator that receives an instruction to immediately re-execute a job immediately executed by the job execution device, wherein the controller immediately re-executes a job corresponding to the second object when receiving an operation of the second operator, and wherein the controller displays a setting screen of the job on the display unit when receiving an operation of a region, other than the second operator, of the second object and executes the job based on a setting received on the setting screen.

According to this configuration, it is possible to immediately re-execute the job corresponding to the second object by operating the second operator, and it is possible to re-execute the job based on the setting received on the setting screen by operating the region, other than the second operator, of the second object.

Appendix 5

The job execution device according to Appendix 1, wherein the storage unit stores a plurality of pieces of processing data to be executed as a job by the job execution device, wherein the second screen includes a third operator that receives an instruct to perform batch execution on the plurality of pieces of processing data stored in the storage unit, and wherein the second object includes a fourth operator that receives an instruction to perform re-execution on the plurality of pieces of processing data batch-executed by the job execution device when an operation of the third operator is received.

According to this configuration, it is possible to batch-execute again a plurality of pieces of processing data that have been batch-executed.

Appendix 6

The job execution device according to Appendix 5, further including a notification unit, wherein the controller causes the notification unit to perform a notification operation in a case where the plurality of pieces of processing data is not stored in the storage unit when an operation of the fourth operator is received.

According to this configuration, when a plurality of pieces of processing data is not stored in the storage unit, the notification unit can be caused to perform the notification operation, and it is possible to receive and read the processing data again.

Appendix 7

The job execution device according to Appendix 5 or 6, wherein the controller batch-re-executes a process on the plurality of pieces of processing data when receiving an operation of the fourth operator, and wherein the controller displays a selection screen for selecting processing data on which re-execution is to be performed from among the plurality of pieces of processing data when receiving an operation of a region, other than the fourth operator, of the second object, and re-executes a process on the processing data selected by a setting of the selection screen.

According to this configuration, it is possible to batch-re-execute a plurality of pieces of processing data by operating the fourth operator, and it is possible to re-execute processing data selected on the selection screen by operating a region, other than the fourth operator, of the second object.

4. Other Configurations

The embodiments described above are preferred embodiments of the present disclosure. However, without being limited to the above-described embodiment, various modifications can be made without departing from the gist of the present disclosure. For example, the processing units of the flowcharts shown in FIGS. 5 and 6 are obtained by division according to the main processing contents in order to facilitate understanding of the processing of the multifunction machine 100. The present disclosure is not limited by the method and the name of division in the processing units shown in the flowchart of FIGS. 5 and 6. In addition, the processing by the multifunction machine 100 can be divided into more processing units depending on the processing contents, or can be divided such that one processing unit includes more processing. Further, the order of processing in the flowcharts is not limited to the illustrated example.

What is claimed is:

1. A job execution device comprising:
a display unit;
a storage unit that stores a first history group that is a history of a job group executed based on a setting received on a first screen, and a second history group that is a history of a job group executed based on a setting received on a second screen different from the first screen; and a controller that controls switching of a screen displayed on the display unit between the first screen and the second screen, wherein the first screen includes a first object that receives an instruction to re-execute a first job that was executed, the first job being included in the first history group, and a second object that receives an instruction to re-execute a second job that was executed, the second job being included in the second history group.

2. The job execution device according to claim 1, wherein the controller displays the first object and the second object on the first screen in chronological order.

3. The job execution device according to claim 1, wherein the second screen includes a first operator that receives an instruction to immediately execute a job, and wherein the second object receives an operation of the first operator and receives an instruction to immediately re-execute the job immediately executed by the job execution device.

4. The job execution device according to claim 3, wherein the second object includes a second operator that receives an instruction to immediately re-execute the job immediately executed by the job execution device, wherein the controller immediately re-executes the job corresponding to the second object when receiving an operation of the second operator, and wherein the controller displays a setting screen of the job on the display unit when receiving an operation of a region, other than the second operator, of the second object and executes the job based on a setting received on the setting screen.

5. The job execution device according to claim 1, wherein the storage unit stores a plurality of pieces of processing data to be executed as a job by the job execution device, wherein the second screen includes a third operator that receives an instruct to perform batch execution on the plurality of pieces of processing data stored in the storage unit, and wherein the second object includes a fourth operator that receives an instruction to perform re-execution on the plurality of pieces of processing data batch-executed by the job execution device when an operation of the third operator is received.

6. The job execution device according to claim 5, further comprising:

a notification unit, wherein the controller causes the notification unit to perform a notification operation in a case where the plurality of pieces of processing data is not stored in the storage unit when an operation of the fourth operator is received.

7. The job execution device according to claim 5, wherein the controller batch-re-executes a process on the plurality of pieces of processing data when receiving an operation of the fourth operator, and wherein the controller displays a selection screen for selecting processing data on which re-execution is to be performed from among the plurality of pieces of processing data when receiving an operation of a region, other than the fourth operator, of the second object, and re-executes a process on the processing data selected by a setting of the selection screen.

* * * * *